United States Patent [19]

Yamaguchi et al.

[11] Patent Number: 4,518,023

[45] Date of Patent: May 21, 1985

[54] PNEUMATIC TIRE

[75] Inventors: Yutaka Yamaguchi, Tokorozawa; Nobuyuki Koizumi, Higashimurayama; Masami Hirano, Kodaira; Tamio Araki, Fuchu; Koichi Kojima, Higashimurayama, all of Japan

[73] Assignee: Bridgestone Tire Co., Ltd., Tokyo, Japan

[21] Appl. No.: 483,034

[22] Filed: Apr. 7, 1983

[30] Foreign Application Priority Data

Jun. 4, 1982 [JP] Japan ............... 57-83218[U]

[51] Int. Cl.³ .................. B60C 9/20; B60C 9/22
[52] U.S. Cl. ............... 152/361 FP; 152/361 DM; 152/361 R
[58] Field of Search ...... 152/361 R, 361 FP, 361 DM

[56] References Cited

U.S. PATENT DOCUMENTS

| 3,831,657 | 8/1974 | Dillenschneider | 152/361 FP |
| 4,050,497 | 9/1977 | Pakur et al. | 152/361 FP |
| 4,169,495 | 10/1979 | Maiocchi | 152/361 DM |

FOREIGN PATENT DOCUMENTS

| 2307327 | 8/1974 | Fed. Rep. of Germany | 152/361 FP |
| 1228241 | 8/1960 | France | 152/361 FP |
| 2428533 | 2/1980 | France | 152/361 FP |
| 102826 | 10/1962 | Netherlands | 152/361 FP |
| 1364426 | 8/1974 | United Kingdom | 152/361 FP |

Primary Examiner—Lois E. Boland
Attorney, Agent, or Firm—Sughrue, Mion, Zinn, Macpeak & Seas

[57] ABSTRACT

A pneumatic tire includes a tread, a pair of sidewalls and a pair of bead portions and further a carcass and a belt for reinforcing the tread, sidewalls and bead portions. The carcass consists of at least one layer of rubber coated cord ply whose organic fiber cords are arranged in parallel with each other in substantially radial surfaces of the tire. The belt consists of a rubber coated metal cord layer folded at least at one edge, whose metal cords are arranged in parallel with each other at relatively small angles with respect to an equatorial line of the tire.

According to the invention, a reinforcing layer of at least one rubber coated layer is arranged in an inside of and in substantially intimate contact with the folded edge of the rubber coated metal cord layer of the belt and extending at least 7% of an overall width of the belt from a folded position of the belt. Cords of the reinforcing layer are organic fiber cords and are in parallel with each other at angles of 0°–40° with respect to the equatorial line of the tire.

4 Claims, 3 Drawing Figures

PNEUMATIC TIRE

BACKGROUND OF THE INVENTION

1. Field of the Invention

This invention relates to a pneumatic tire, and more particularly to a tire reinforced by a belt to improve its durability at high speeds particularly advantageous for a four-wheeled passenger car.

2. Description of the Prior Art

In general, such a tire includes a carcass consisting of at least one layer of rubber coated cord ply whose organic fiber cords are arranged in parallel with each other in substantially radial surfaces of the tire and a belt consisting of a rubber coated cord layer folded at least at one edge, whose metal cords are arranged in parallel with each other at relatively small angles with respect to an equatorial line of the tire for reinforcing a tread, a pair of sidewalls and a pair of bead portions.

It is generally known to provide a belt having at least one folded edge. An auxiliary layer is embraced by folded portions at both the edges of the belt or whose cords are arranged crossing cords of the belt exclusive of the folded portions.

Recently, there has been a tendency for vehicles to travel at higher speeds to bring the tires under much severe conditions of use. Accordingly, filaments of metal cords at the folded portions are apt to be cut off to cause cutting off of the cords resulting in a considerably shortened durable life.

SUMMARY OF THE INVENTION

It is an object of the invention to provide an improved pneumatic tire including a belt having folded portions and metal cords as reinforcing elements, which effectively eliminate the disadvantages of the prior art.

The inventors had carried out many experiments on breaking down at folded edges of belt consisting of a rubber coated layer whose metal cords are in parallel with each other at relatively small angles with respect to an equatorial line of a tire, the belt being provided for reinforcing a tread of the tire. The invention resides in the discovery in the experiments that when a vehicle travels under a load at high speeds, the metal cords at the folded edges are subjected to a considerable tensile load. If a reinforcing layer is embraced by the folded edge, the tensile load is surprisingly reduced.

The above object of the invention can be achieved by the feature of comprising a reinforcing layer of at least one rubber coated layer arranged in an inside of and in substantially intimate contact with the folded edge of said rubber coated metal cord layer of said belt and extending within a width of at least 7% of an overall width of said belt from a folded position of the rubber coated metal cord layer, whose cords are organic cords such as nylon, polyester and the like other than metal cords and are in parallel with each other at an angle of 0–40° with respect to the equatorial line of the tire.

According to the invention the belt preferably comprises the reinforcing layers arranged in insides of the folded edges of the rubber coated cord layer of the belt, respectively, and further comprises an auxiliary layer having a width somewhat less than the overall width of the belt between the folded edges of the belt and whose metal cords are arranged in parallel with each other and at the same angles with respect to the equatorial line but in directions different from those of the rubber coated metal cord layer.

In carrying out the invention, moreover, the auxiliary layer is preferably arranged radially innermost in the belt and elongations of the cords subjected to the 5 kg tensile load are preferably progressively larger in the order of the auxiliary, main and reinforcing layers.

It is an essential feature of the invention to include a reinforcing layer of at least one rubber coated layer arranged in an inside of and in substantially intimate contact with the folded edge of the rubber coated cord layer of the belt and extending within a width of at least 7% of an overall width of the belt from a folded position of the rubber coated cord layer. When the width is less than 7%, the reinforcing layer does not sufficiently serve to support the tensile force acting upon the folded metal cords at the edges cut off the cords. The same holds true if the reinforcing layer is arranged at a location other than the inside of the folded portion. Moreover, if metal cords are used in the reinforcing layer, the cords concentrically support the tensile force resulting in loss of the balanced tensile force distribution in conjugation with the folded portions. For a balanced distribution of the tensile force, it is preferable to use a thermocontracting organic fiber such as nylon, polyester or the like.

The expected object can be accomplished by arranging the reinforcing layer having cords of such a material with a width more than 7%, more preferably 10–35% and in an extreme case it may extends over all the width of the belt. However, if the cords are at more than 40° with respect to the equatorial line of the tire, the reinforcing layer does not serve to support the tensile force with the folded portions of the belt. Accordingly, the angles are preferably 0–40°, more preferably near 0°. This reinforcing layer is sufficient as a single layer. However, the reinforcing layer may be two or more layers. In this case, the reinforcing layers preferably have a different width such that one set of their edges are coincident at the folded position of the belt and the other edges form steps.

In order that the invention may be more clearly understood, preferred embodiments will be described, by way of example, with reference to the accompanying drawings.

DETAILED DESCRIPTION OF THE PREFERRED EMBODIMENT

Figure 1:
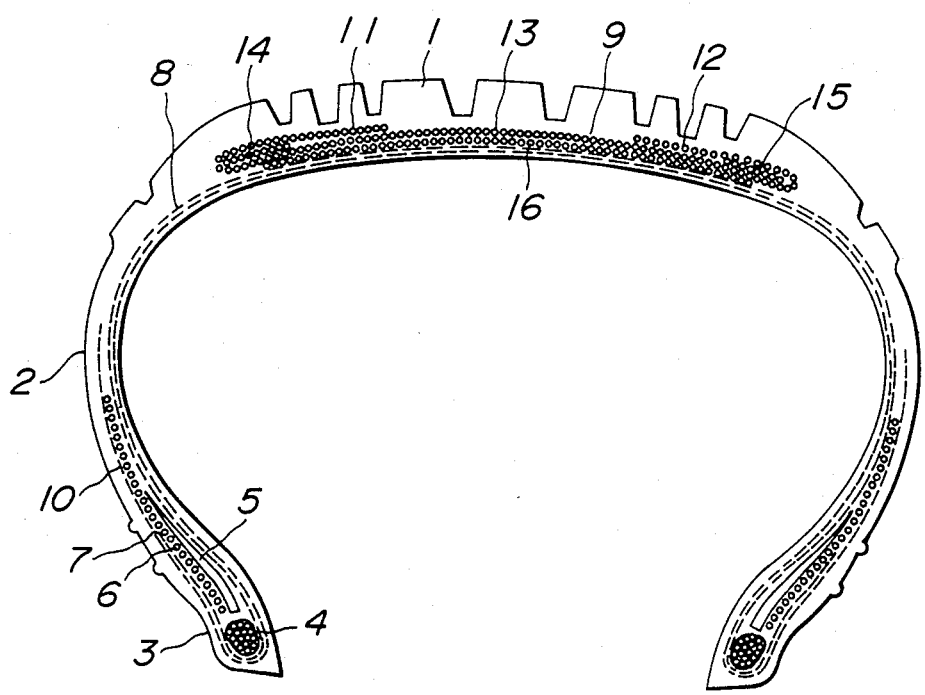
FIG. 1 is a radial cross-sectional view of a tire according to the invention.

FIG. 1 illustrates a tire of one embodiment of the invention in section taken along a radial plane including a rotation axis of the tire. The tire comprises a tread 1, a pair of sidewalls 2 and a pair of bead portions 3 each including a bead core 4. A bead filler rubber 5 of a hard rubber is preferably arranged radially outwardly of each of the bead core 4 and if required, there is provided a reinforcing cord layer 6 outwardly of the bead filler rubber 5 and a filler rubber 7 of a somewhat soft rubber outwardly of the cord layer 6. A carcass 8 consists of at least one layer of a rubber coated ply including organic fiber cords and has edges each turned up from the inside to outside to surround the bead core 4, filler rubbers 5 and 7 and cord layer 6. A belt 9 is arranged in the tread 1 to encircle a crown portion of the carcass 8. In this embodiment, the carcass 8 consists of two plies of polyester cords, one ply having ends each of which extends beyond the radially outer end of the reinforcing cord layer 6 and terminates in the sidewall radially outward of the maximum width portion thereof, and the other ply having ends each of which overlaps the inner portion of the reinforcing cord layer 6. The polyester cords of the two plies are arranged crossing to each other and at a slight angle such as approximately 5° relative to radial surfaces. With this embodiment, the belt 9 comprises a main layer 13 having at its edges folded portions 11 and 12 and reinforcing layers 14 and 15 according to the invention and further an auxiliary layer 16. The size of this tire is PS 195/70 VR 14.

Figure 2:
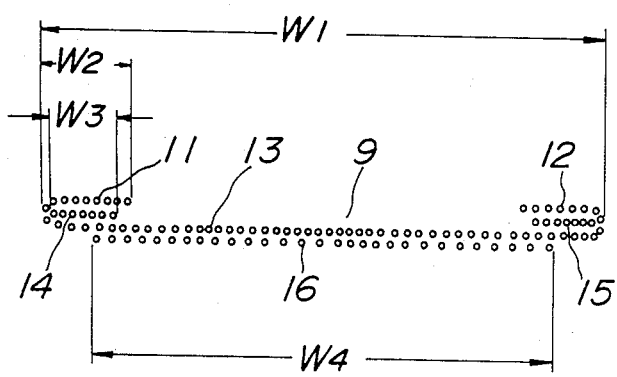
FIG. 2 is a schematic illustration showing a lamination of a belt according to the invention.

FIG. 2 illustrates how to arrange the layers of the belt. $W_1$ denotes an overall width of the belt, $W_2$ a width of turned portions 11 and 12, $W_3$ a width of reinforcing layers 14 and 15 and $W_4$ a width of an auxiliary layer 16.

Figure 3:
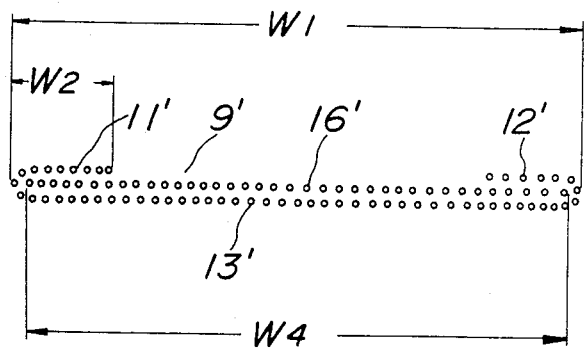
FIG. 3 is a schematic illustration showing a lamination of a belt of the prior art.

FIG. 3 illustrates a prior art arrangement of a belt of folded type. A main layer 13' of a belt has turned portions 11' and 12' enclosing cut edges of an auxiliary layer 16' having metal cords arranged crossing with each other in the same manner as in the main layer 13'.

In an experiment, tires had the belt arrangement as shown in FIG. 3. Steel cords of main layers 13(13')and auxiliary layers 16(16') were arranged crossing with each other at approximately 22° with respect to equatorial lines of the tire. The tires had an overall width $W_1$ of 140 mm, a width $W_2$ of folded portions of 40 mm and a width of the auxiliary layers 16 of 120 mm. Elongations of the steel cords of the main and auxiliary layers were approximately 0.6%, when they were subjected to a tensile load of 5 kg. The tires having the belt arrangement shown in FIG. 3 were referred to as "A tires". Cord cut-off test results of the A tires were indicated by an index number "100". Tires which were modified from A tires to arrange the auxiliary layers 16' radially inwardly of the main layers 13' exhibited index number "120" which were worse than "100".

The cord cut-off tests were effectuated under the following conditions. The tires were mounted on a normal rim and were rolled on a test drum being subjected to a constant transverse or lateral force under 130% load of the normal load for long hours.

With the tire having the belt arrangement shown in FIG. 2 according to the invention, steel cords similar to the above described steel cords were used for the main and auxiliary layers 13 and 16, and organic fiber cords of 1,260 d/2 nylon having a 6% elongation under 5 kg tensile load were used for the reinforcing layers 14 and 15. The organic fiber cords were in parallel with equatorial line of the tires and had a 25 mm width $W_3$ of the reinforcing layers 14 and 15, that was 18% of the overall width $W_1$. These tires were referred to as "E tires" and exhibited the index number "20" which indicated a remarkably improved durability of the tires.

Tires referred to as "F tires" were tested, which were similar to the E tires with exception that steel cords were used which had an elongation of approximately 1.6% under the 5 kg tensile load. Moreover, tires referred to as "G tires" were tested, which were identical with the E tires with exception that reinforcing layers 14 and 15 were constructed in a unitary layer extending between the folded portions 11 and 12. These F and G tires exhibited a remarkably reduced index number "5" to realize a greatly improved durability.

In connection therewith, tires referred to as "C tires" were tested, which were similar to E tires but reinforcing layers 14 and 15 had a width $W_3$ of 5 mm i.e. 3.6% of the overall width $W_1$ of the belt whose cords were in parallel with equatorial lines of the tires. The C tires exhibited the index number of 90. Moreover, "D tires" identical with C tires with exception of cords arranged at 50° with respect to equatorial lines exhibited the index number of 110. The C and D tires did not improve their durability.

An experiment on the width $W_2$ of folded portions of the belt was carried out. It has been found in the experiment that the expected effect can be advantageously achieved when the width $W_2$ of the folded portions is 17-40%, preferably at least 35% of the overall width of the belt.

Moreover, experiments on elongations of cords of the auxiliary layer 16, main layer 13 and reinforcing layers 14 and 15 of the belts 9 of a number of tires subjected to the 5 kg tensile load were repeatedly effected. It has been ascertained from results of the experiments that the following elongations of the cords are effective for the purpose, 0.3-5%, preferably 0.4-1.0% for the auxiliary layer, 0.8-2.5%, preferably 1.0-2.0% for the main layer and 4-14%, preferably 5-10% for the reinforcing layers.

As can be seen from the above description, with a tire including a belt of a rubber coated layer folded at least at one edge, whose metal cords are in parallel with each other at sight angles relative to an equatorial line of the tire for reinforcing the tire body in conjunction with a radial carcass, according to the invention reinforcing layers are arranged along the insides of the folded portions to effectively eliminate in a simple manner the disadvantage of the less durability due to cutting off of cords at folded positions which is apt to occur in the prior art tires.

It is further understood by those skilled in the art that the foregoing description is that of preferred embodiments of the disclosed tires and that various changes and modifications may be made in the invention without departing from the spirit and cope thereof.

What is claimed is:

1. A pneumatic tire comprising; a tread, a pair of sidewalls and a pair of bead portions, a carcass consisting of at least one layer of rubber coated cord ply whose organic fiber cords are arranged in parallel with each other in substantially radial surfaces of the tire, a belt comprising a rubber coated metal cord main layer folded at least at one edge, whose metal cords are arranged in parallel with each other at relatively small angles with respect to an equatorial line of the tire for reinforcing a body of the tire, said belt further comprising at least one reinforcing layer of at least one rubber coated layer arranged inside of and in substantially intimate contact with the folded edge of said rubber coated metal cord main layer of said belt and having a width of $W_3$ of 10-35% of an overall width of said belt, cords of said reinforcing layer being made of a thermocontracting organic fiber and being in parallel with each other at angles of 0° or near 0° with respect to the equatorial line of the tire, and an auxiliary layer arranged radially innermost in the belt and having a width less than the overall width of said belt between the folded edges of the belt, said auxiliary layer having metal cords arranged in parallel with each other and at substantially the same angles with respect to the equatorial line but in directions different from those of the rubber coated metal cord main layer, and elongations of said cords in said main, reinforcing and auxiliary layers subjected to 5 kg tensile load are progressively larger in the order of the auxiliary, main and reinforcing layers.

2. A tire as set forth in claim 1, wherein said belt comprises a plurality of reinforcing layers arranged in insides of the folded edges of said rubber coated metal cord main layer of the belt, and said auxiliary layer having a width less than the overall width of said belt between the folded edges of the belt overlaps said reinforcing layers.

3. A tire as set forth in claim 1, wherein said width ($W_2$) of said folded portion of said belt at its edge is 17–40% of the overall width of the belt.

4. A tire as set forth in claim 1, wherein elongations of the cords of said auxiliary layer, the main layer of the belt and said reinforcing layer subjected to 5 kg tensile load are 0.4–1.0%, 1.0–2.0% and 5–10%, respectively.

* * * * *